(12) United States Patent
You et al.

(10) Patent No.: US 7,961,796 B2
(45) Date of Patent: Jun. 14, 2011

(54) APPARATUS AND METHOD FOR CINR ESTIMATION IN A WIRELESS COMMUNICATION SYSTEM

(75) Inventors: Hwa-Sun You, Suwon-si (KR); Ha-Young Yang, Yongin-si (KR); Joon-Young Bae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 382 days.

(21) Appl. No.: 11/971,428

(22) Filed: Jan. 9, 2008

(65) Prior Publication Data

US 2008/0165677 A1 Jul. 10, 2008

(30) Foreign Application Priority Data

Jan. 9, 2007 (KR) .................. 10-2007-0002339

(51) Int. Cl.
*H04K 1/10* (2006.01)
(52) U.S. Cl. ........ 375/260; 375/259; 375/130; 375/150; 370/241; 370/252
(58) Field of Classification Search .................. 370/241, 370/252, 210; 375/259, 260, 130, 139, 147, 375/150

See application file for complete search history.

(56) References Cited

U.S. PATENT DOCUMENTS

| 7,606,299 | B2 | 10/2009 | Chang et al. | |
|---|---|---|---|---|
| 2005/0175123 | A1* | 8/2005 | Gurney et al. | 375/324 |
| 2006/0098749 | A1* | 5/2006 | Sung et al. | 375/260 |
| 2007/0071075 | A1* | 3/2007 | Yang et al. | 375/150 |
| 2007/0201568 | A1* | 8/2007 | Bae et al. | 375/260 |
| 2008/0096509 | A1* | 4/2008 | Ling | 455/273 |
| 2010/0061427 | A1* | 3/2010 | Lopez-Risueno et al. | 375/150 |

FOREIGN PATENT DOCUMENTS

| KR | 10-2006-0001734 A | 1/2006 |
|---|---|---|
| KR | 10-2007-0078476 A | 8/2007 |

* cited by examiner

*Primary Examiner* — William Trost, IV
*Assistant Examiner* — Siming Liu
(74) *Attorney, Agent, or Firm* — Jefferson IP Law, LLP

(57) ABSTRACT

An apparatus and a method for estimating a Carrier to Interference and Noise Ratio (CINR) of an uplink channel in a wireless communication system are provided. The apparatus includes a subcarrier separator for separating subcarrier bundles from a received signal, a detector for calculating squares of correlation values acquired by correlating one or more codewords with signal streams of the separated subcarrier bundles, and a CINR estimator for estimating a CINR using a maximum value and an average value of the correlation value squares calculated at the detector. With the accurate CINR estimated, the channel information delivery and the stable system operation can be achieved.

20 Claims, 7 Drawing Sheets

APPARATUS AND METHOD FOR CINR ESTIMATION IN A WIRELESS COMMUNICATION SYSTEM

PRIORITY

This application claims the benefit under 35 U.S.C. §119(a) to a Korean patent application filed in the Korean Intellectual Property Office on Jan. 9, 2007 and assigned Serial No. 2007-2339, the entire disclosure of which is hereby incorporated by reference.

BACKGROUND OF THE INVENTION

1. Field of the Invention

The present invention relates generally to an apparatus and a method for estimating a Carrier to Interference and Noise Ratio (CINR) in a wireless communication system. More particularly, the present invention relates to an apparatus and a method for estimating a CINR in a wireless communication system which transmits an orthogonal or quasi-orthogonal signal stream.

2. Description of the Related Art

In a wireless communication system, a base station performs scheduling and determines transmission parameters to send data to terminals. The base station performs these tasks using uplink fast feedback information received from the terminals in its service coverage. With the uplink fast feedback signals received, the base station determines the channel condition of the terminals. Knowing the channel condition of the terminals, the base station transmits data per slot by selecting the terminal having the best channel condition. The base station determines the transmission parameters according to the channel condition information of the terminal to which the data will be sent. Herein, the transmission parameters include a data rate, a coding rate and a modulation order.

When the wireless communication system adopts an Orthogonal Frequency Division Multiple Access (OFDMA) scheme, the terminals send the fast feedback information to a serving base station on a physical channel for sending the uplink fast feedback information. Herein, the physical channel is referred to as a fast feedback channel.

That is, in the time interval for the communications with the serving base station, the terminals periodically report the fast feedback information to the serving base station using the fast feedback channel.

In doing so, the base station controls a power of the uplink channel by estimating a Carrier to Interference and Noise Ratio (CINR) of the fast feedback channel received from the terminals so as to mitigate the inter-cell interference. The base station controls the power of the uplink channel using the CINR of the fast feedback channel as the CINR of the uplink channel. For example, the base station estimates the CINR using extra information relating to codewords and pilots of symbols received from the terminals in the service coverage on the fast feedback channel.

When the CINR estimated by the base station is inaccurate, the operation of power control of the uplink channel is not precisely carried out. As a result, the increased inter-cell interference degrades the link performance and Quality of Service (QoS) requirement is not satisfied.

Therefore, the base station of the wireless communication system requires a method for estimating a reliable CINR of the fast feedback channel.

SUMMARY OF THE INVENTION

An aspect of the present invention is to address at least the above-mentioned problems and/or disadvantages and to provide at least the advantages below. Accordingly, an aspect of the present invention is to provide an apparatus and a method for efficiently estimating a CINR in an environment under a severe signal distortion in a wireless communication system.

Another aspect of the present invention is to provide an apparatus and a method for efficiently estimating a CINR through an uplink fast feedback channel in a wireless communication system.

Yet another aspect of the present invention is to provide an apparatus and a method for estimating a CINR using a relation between a maximum value and an average value of an asynchronous detector output in a wireless communication system to send an orthogonal or quasi-orthogonal signal stream.

In accordance with an aspect of the present invention, an apparatus for estimating a CINR of an uplink channel in a wireless communication system is provided. The apparatus includes a subcarrier separator for separating subcarrier bundles from a received signal, a detector for calculating squares of correlation values acquired by correlating one or more codewords with signal streams of the separated subcarrier bundles, and a CINR estimator for estimating a CINR using a maximum value and an average value of the correlation value squares calculated at the detector.

In accordance with another aspect of the present invention, a method for estimating a CINR of an uplink channel in a wireless communication system is provided. The method includes separating subcarrier bundles from a received signal, calculating squares of correlation values acquired by correlating one or more codewords with signal streams of the separated subcarrier bundles, calculating a maximum value and an average value of the correlation value squares, and estimating a CINR using the maximum value and the average value.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following detailed description taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions or constructions are omitted for clarity and conciseness.

Exemplary embodiments of the present invention provide a technique for estimating a Carrier to Interference and Noise Ratio (CINR) in a wireless communication system which transmits an orthogonal or quasi-orthogonal signal stream.

While an Orthogonal Frequency Division Multiple Access (OFDMA) wireless communication system is illustrated as an example, the present invention is applicable to other wireless communication systems.

Figure 1:
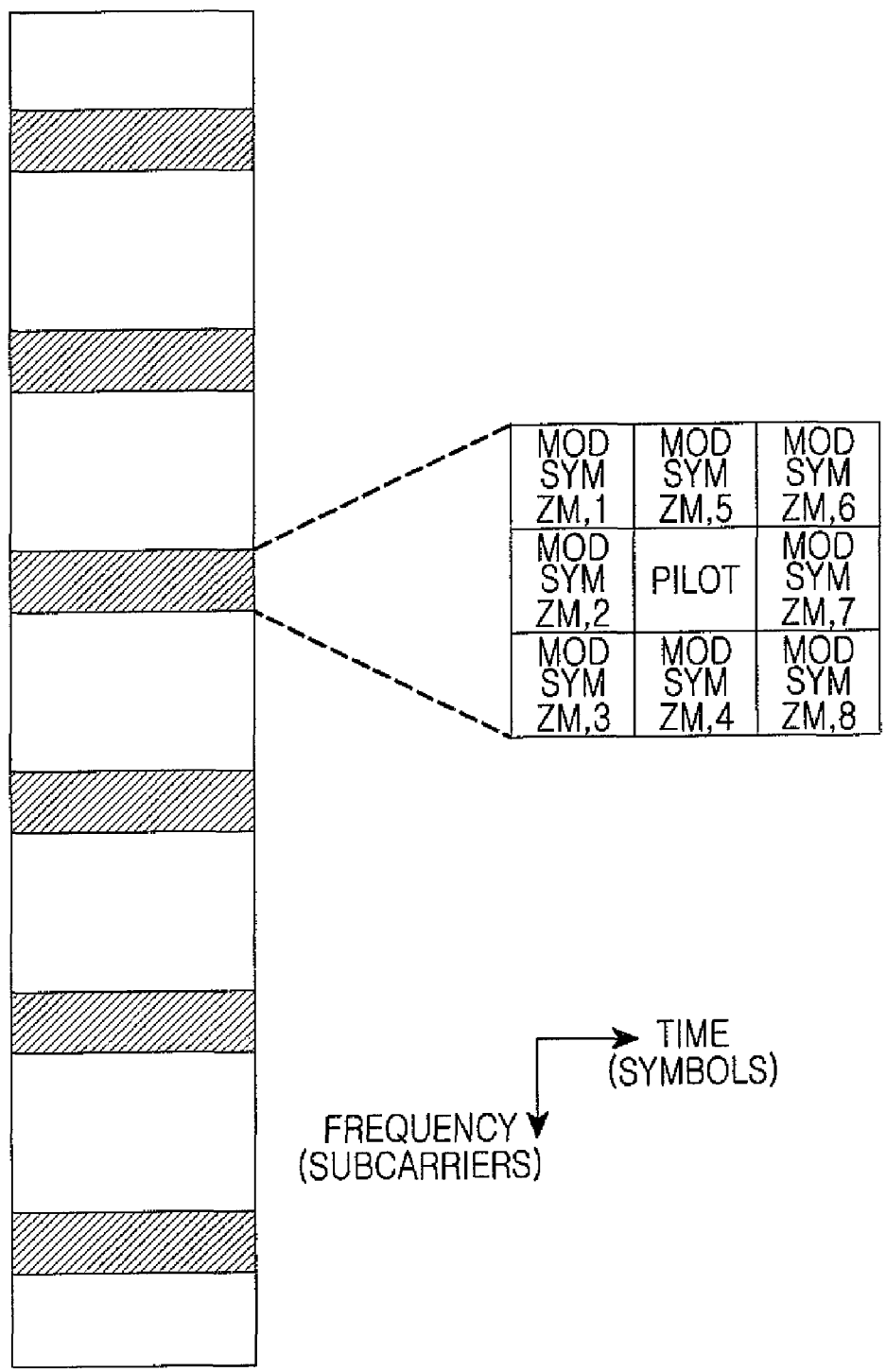
FIG. 1 is a diagram of a resource allocation structure according to an exemplary embodiment of the present invention.
Figure 2:
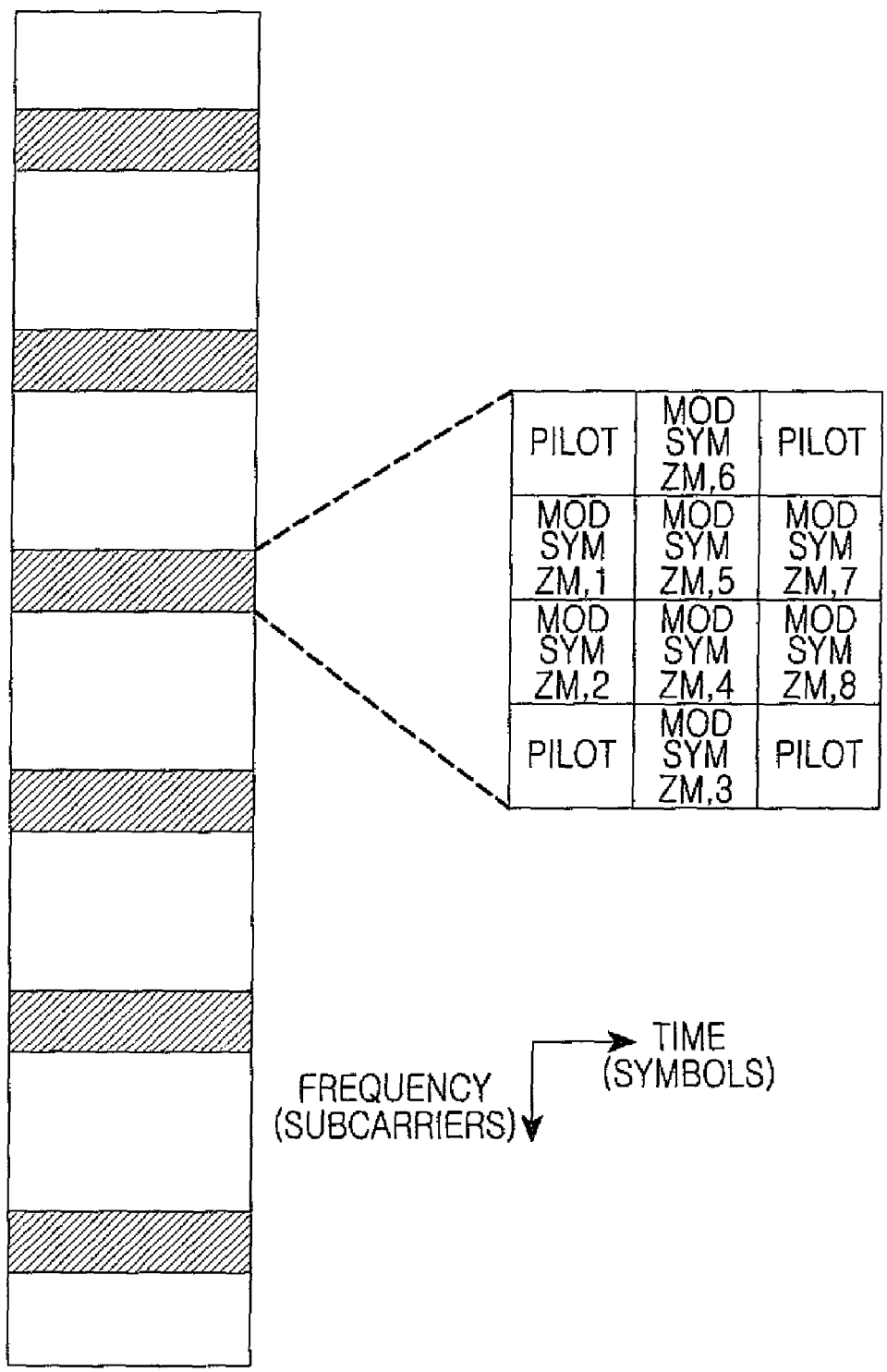
FIG. 2 is a diagram of a resource allocation structure according to another exemplary embodiment of the present invention.

In an exemplary implementation, the wireless communication system may constitute a fast feedback channel as shown in FIGS. 1 and 2. FIG. 1 depicts an Optional Partial Usage of Sub-Channels (OPUSC) and FIG. 2 depicts a Partial Usage of Sub-Channels (PUSC).

FIG. 1 illustrates a resource allocation structure in a wireless communication system according to an exemplary embodiment of the present invention.

The wireless communication system allocates six 3×3 subcarrier bundles (tiles) as a fast feedback channel in a frequency-time axis as shown in FIG. 1. In a 3×3 subcarrier bundle, eight subcarriers along the edge carry modulation symbols and one subcarrier at the center carries a pilot symbol.

FIG. 2 illustrates a resource allocation structure in a wireless communication system according to another exemplary embodiment of the present invention.

The wireless communication system allocates six 4×3 subcarrier bundles of a frequency-time axis as a fast feedback channel as shown in FIG. 2. In a 4×3 subcarrier bundle, four subcarriers at the corners carry a pilot symbol and the remaining eight subcarriers carry modulation symbols.

Terminals of the wireless communication system transmit feedback information to a base station on the fast feedback channel constituted as above. An exemplary terminal is constructed as illustrated in FIG. 3.

Figure 3:
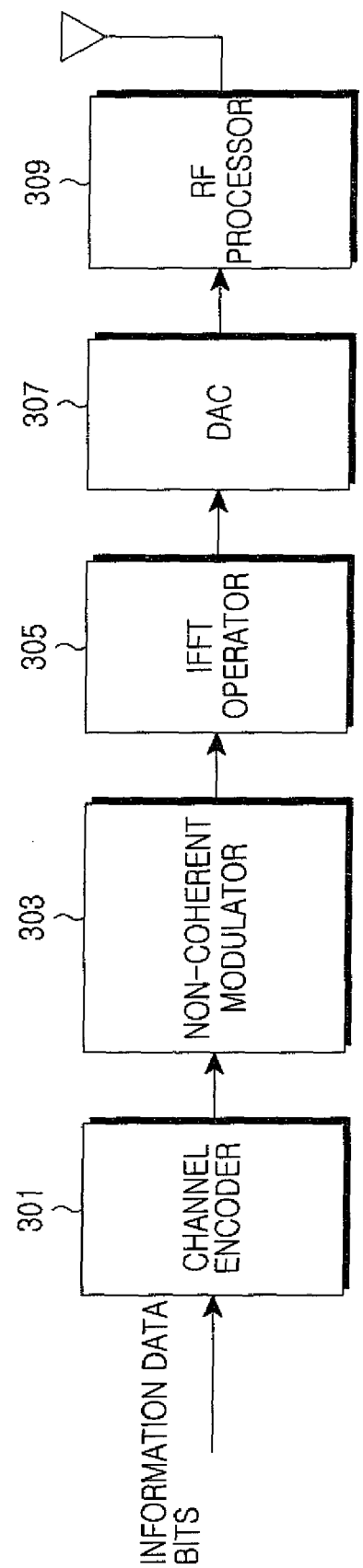
FIG. 3 is a block diagram of a terminal for sending feedback information according to an exemplary embodiment of the present invention.

FIG. 3 is a block diagram of a terminal for sending feedback information according to an exemplary embodiment of the present invention.

Referring to FIG. 3, the terminal includes a channel encoder 301, a non-coherent modulator 303, an Inverse Fast Fourier Transform (IFFT) operator 305, a Digital/Analog Converter (DAC) 307 and a Radio Frequency (RF) processor 309.

The channel encoder 301 determines and outputs a codeword corresponding to the uplink fast feedback information data provided from an upper stage.

The non-coherent modulator 303 generates transmit symbols by non-coherently modulating the codeword output from the channel encoder 301. In an exemplary implementation, the non-coherent modulator 303 adopts an orthogonal modulation.

The IFFT operator 305 converts the frequency-domain transmit symbols output from the non-coherent modulator 303 to time-domain sample data (OFDM symbols) through the IFFT.

The DAC 307 converts the digital sample data received from the IFFT operator 305 to an analog signal.

The RF processor 309 up-converts the baseband signal output from the DAC 307 to an RF signal and transmits the RF signal via an antenna.

Figure 4:
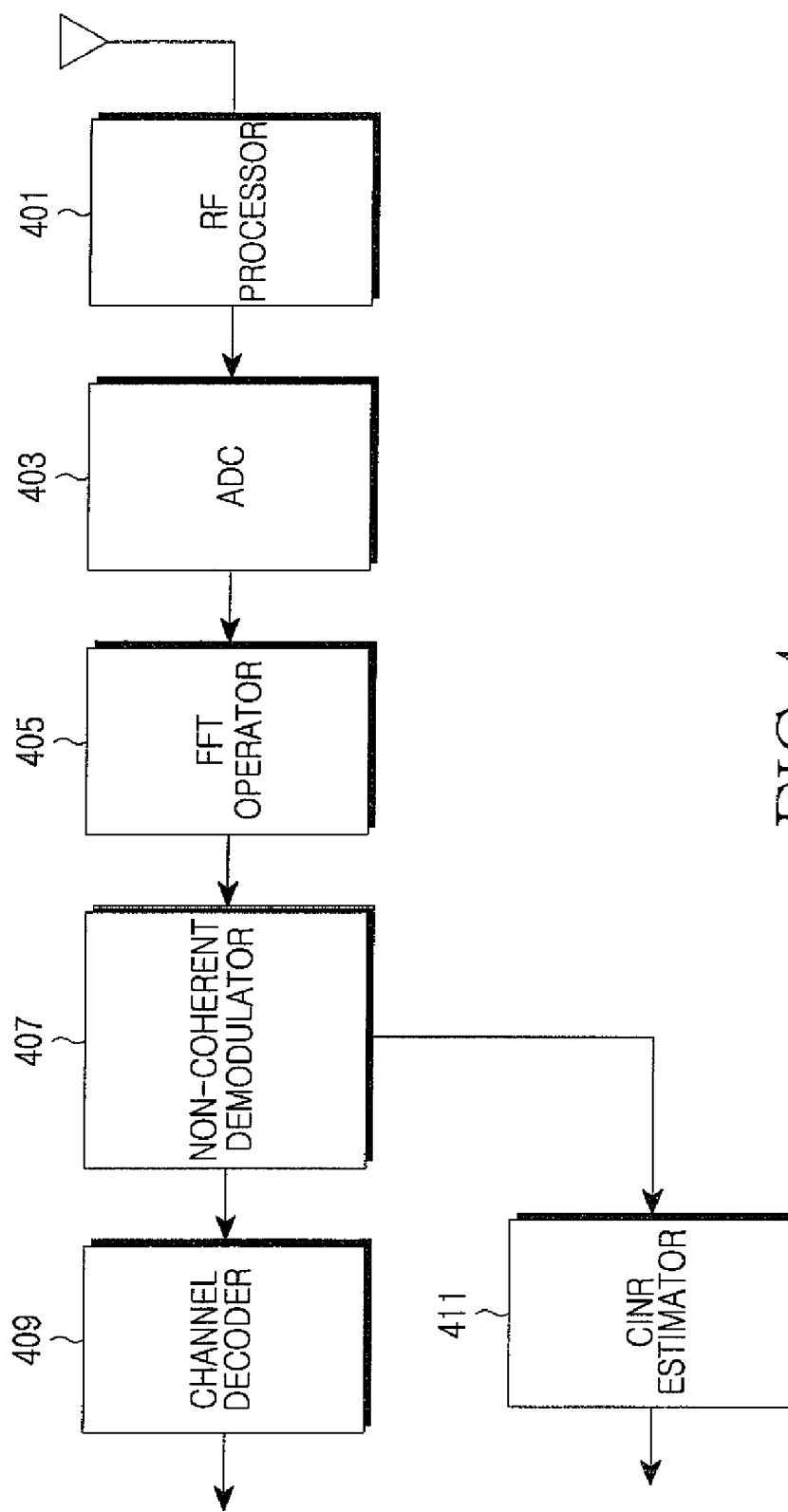
FIG. 4 is a block diagram of a base station for receiving feedback information according to an exemplary embodiment of the present invention.

FIG. 4 is a block diagram of a base station for receiving feedback information according to an exemplary embodiment of the present invention.

Referring to FIG. 4, the base station includes an RF processor 401, an Analog/Digital Converter (ADC) 403, an FFT operator 405, a non-coherent demodulator 407, a channel decoder 409 and a CINR estimator 411.

The RF processor 401 down-converts an RF signal received on an antenna to a baseband signal. The ADC 403 converts the analog signal output from the RF processor 401 to a digital signal.

The FFT operator 405 converts the time-domain sample data output from the ADC 403 to frequency-domain data through an FFT process.

The non-coherent demodulator 407 calculates a soft-decision value by non-coherently demodulating the receive symbols output from the FFT operator 405. Herein, the non-coherent demodulator 407 calculates the soft-decision value through asynchronous detection.

The non-coherent demodulator 407 includes a tile separator (not shown) to separate the tile bundles from the signal output from the FFT operator 405 and to perform the non-coherent demodulation. In an exemplary implementation, the tile separator separates six tiles of FIG. 1 or FIG. 2 from the signal provided from the FFT operator 405. The tile separator may be constituted separately from the non-coherent demodulator 407.

The channel decoder 409 decodes the soft-decision value output from the non-coherent demodulator 407 at a corresponding coding rate and demodulates the data by determining the codeword of the soft-decision value. More specifically, the channel decoder 409 demodulates the data by determining the codeword about a maximum soft-decision value at the non-coherent demodulator 407.

The CINR estimator 411 estimates the CINR of the fast feedback channel using an average value and a maximum correlation square of correlation squares provided from the non-coherent demodulator 407.

As such, the base station estimates the CINR of the fast feedback channel using the non-coherent demodulator 407 and the CINR estimator 411. For the asynchronous detection, the non-coherent demodulator 407 and the CINR estimator 411 are constructed as shown in FIG. 5.

Figure 5:
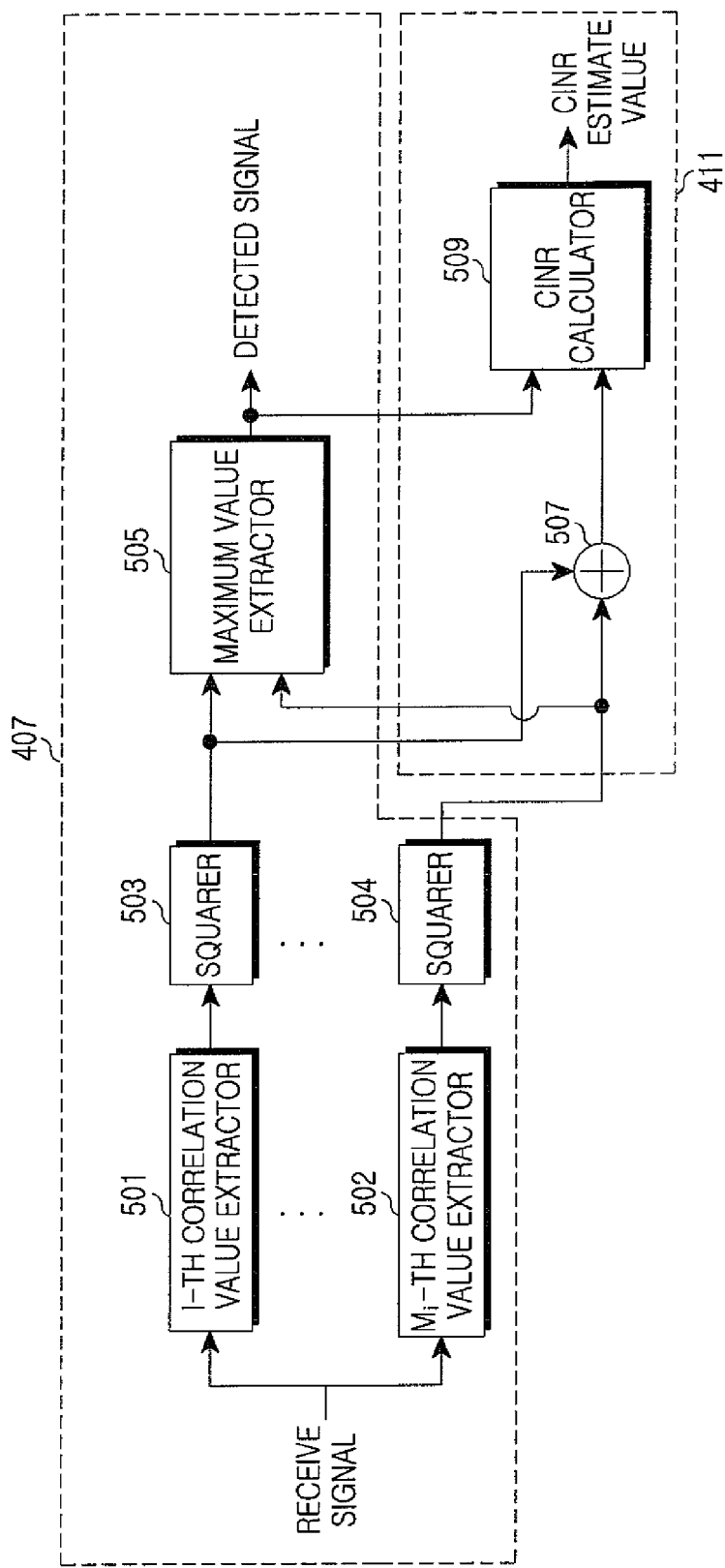
FIG. 5 is a detailed block diagram of the base station for estimating a CINR according to an exemplary embodiment of the present invention.

FIG. 5 is a detailed block diagram of a base station for CINR estimation according to an exemplary embodiment of the present invention.

A non-coherent demodulator 407 includes correlation value extractors 501 and 502, squarers 503 and 504 and a maximum value extractor 505.

The correlation extractors 501 and 502 correlate the signal stream of the six tiles provided from the tile separator with the codewords set at the correlation extractors 501 and 502. Herein, the number of the correlation value extractors 501 and 502 is the same as the number of the codewords used in the wireless communication system.

The squarers 503 and 504 eliminate phase components by squaring the correlation values provided from the correlation extractors 501 and 502 respectively. For example, the squares 503 and 504 square the correlation values provided from the correlation extractors 501 and 502 respectively based on Equation (1).

$$r[i] = \left| \sum_{k=1}^{L} C_k^*[i] \cdot Y_k \right|^2, \; i = 0, \ldots, M_i - 1 \quad (1)$$

In Equation (1), r[i] denotes the square of the correlation value of the $i^{th}$ codeword of $M_i$-ary codewords used in the wireless communication system with the receive signal stream. r[i] indicates the asynchronous detection output of the $i^{th}$ codeword and $Y_k$ indicates the $i^{th}$ signal component of the receive signal stream. $C_k[i]$ denotes the $k^{th}$ signal component of the $i^{th}$ codeword. The length of the $i^{th}$ codeword is L. For example, using the tiles of FIG. 1, the length of the codeword is 54. Using the tiles of FIG. 2, the length of the codeword is 72.

The squarers 503 and 504 square the correlation of every signal component $C_k[i]$ and the receive signal stream components $Y_k$ of the corresponding codeword from the correlation extractors 501 and 502 based on Equation (1). Since the receive signal stream is the bundles of tiles including a certain number of tones in Equation (1), Equation (1) can be re-expressed as Equation (2).

$$r[i] = \sum_{m=q}^{tile} \left| \sum_{k=1}^{tone} C_{m,k}^*[i] \cdot Y_{m,k} \right|^2 \quad (2)$$

In Equation (2), r[i] denotes the square of the correlation value of the $i^{th}$ codeword of $M_i$-ary codewords used in the wireless communication system and the receive signal stream, $Y_{m,k}$ denotes the $k^{th}$ tone of the $m^{th}$ tile of the receive signal stream, $C_{m,k}[i]$ denotes the $k^{th}$ signal component of the $m^{th}$ tile of the $i^{th}$ codeword.

The maximum value extractor 505 extracts the square of the maximum correlation value from the squares of the correlation values provided from the squarers 503 and 504.

As further illustrated in FIG. 5, a CINR estimator 411 includes an adder 507 and a CINR calculator 509.

The adder 507 adds the squares of the correlation values output from the squarers 503 and 504 and outputs the result to the CINR calculator 509.

The CINR calculator 509 estimates the CINR using the maximum correlation value square of the correlation value squares output from the maximum value extractor 505 and the average value of the correlation value squares output from the adder 507.

In doing so, when the signal streams of the codewords are orthogonal, there is no correlation value between different signal streams. Thus, the CINR calculator 509 estimates the CINR based on Equation (3).

$$CINR = \frac{M \cdot \max(r[i]) - \sum_{i=0}^{M-1} r[i]}{\sum_{i=0}^{M-1} r[i] - \max(r[i])} \quad (3)$$

In Equation (3), M denotes the number of codewords used in the wireless communication system, max(r[i]) denotes the maximum value extracted at the maximum value extractor 505 and $$\sum_{i=0}^{M-1} r[i]$$

denotes the sum of the correlation value squares provided from the adder 507.

As expressed in Equation (3), the CINR calculator 509 calculates the CINR using the average receive power $$\max(r[i]) - \frac{\sum_{i=0}^{M-1} r[i]}{M}$$

acquired by subtracting the average of the correlation value squares from the maximum value, and the average receive noise power $$\frac{\max(r[i])}{M} - \frac{\sum_{i=0}^{M-1} r[i]}{M}$$

acquired by subtracting the average of the correlation value squares from the maximum value divided by the M.

According to an exemplary implementation, when the signal streams of the codewords are quasi-orthogonal, the CINR calculator 509 estimates the CINR based on Equation (4). If the number of the codewords used in the wireless communication system is greater than the length of the receive signal stream or the receive signal stream includes the pilot at the center, the signal streams of the codewords are quasi-orthogonal.

$$CINR = \frac{M \cdot \max(r[i]) - \sum_{i=0}^{M-1} r[i]}{\sum_{i=0}^{M-1} r[i] - (1 + \rho)\max(r[i])} \quad (4)$$

In Equation (4), M denotes the number of codewords used in the wireless communication system, ρ denotes the sum of the correlation values of the codewords as expressed in Equation (5), max(r[i]) denotes the maximum value extracted at the maximum value extractor 505 and $$\sum_{i=0}^{M-1} r[i]$$

denotes the sum of the correlation value squares provided from the adder 507.

As expressed in Equation (4), the CINR calculator 509 calculates the CINR using the average receive power $$\max(r[i]) - \frac{\sum_{i=0}^{M-1} r[i]}{M}$$

acquired by subtracting the average of the correlation value squares from the maximum value and the average receive noise power $$\frac{\max(r[i])}{M} - \frac{(1+\rho)\sum_{i=0}^{M-1} r[i]}{M}$$

acquired by considering the difference between the average of the correlation value squares and the maximum value and the sum of the correlation values of the codewords.

The CINR calculator 509 includes a correlator (not shown) to calculate the correlation value between the codewords based on Equation (5).

$$\rho_i = \sum_{l \neq m} \left| \sum_{k=1}^{L} C_k[l] \cdot C_k^*[m] \right|^2 \quad (5)$$

In Equation (5), $C_k[l]$ denotes the $k^{th}$ signal component of the $i^{th}$ codeword.

$\rho_l$ in Equation (5) signifies the correlation property between different codewords. Since $\rho_l$ is a constant value regardless of the signal stream index l, $\rho_l$ can be expressed simply as $\rho$.

Now, a method for estimating the CINR of the fast feedback channel using the base station constructed as above is explained in greater detail.

Figure 6:
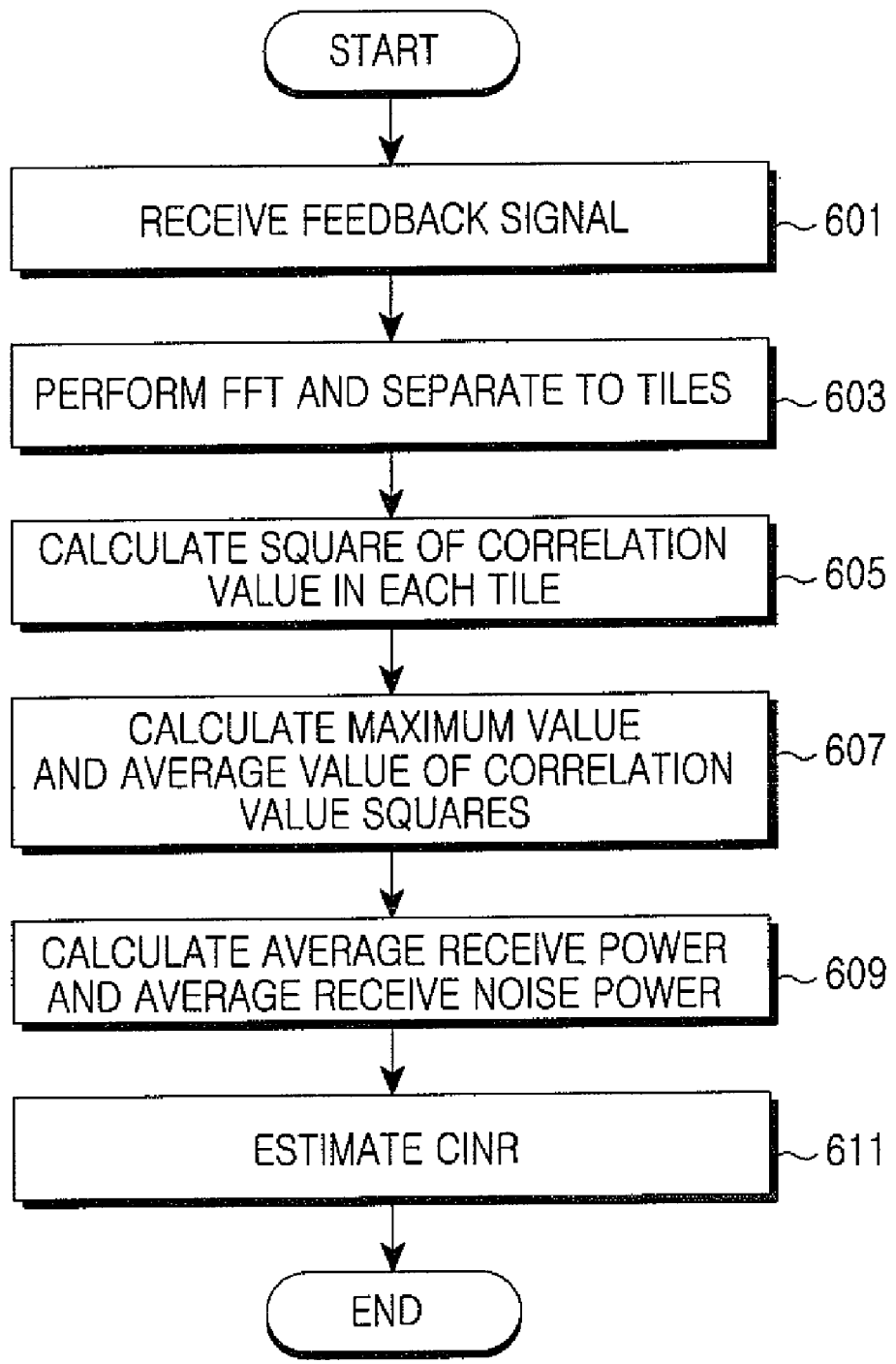
FIG. 6 is a flowchart of a method for estimating the CINR at the base station according to an exemplary embodiment of the present invention.

FIG. 6 illustrates a method for estimating the CINR at a base station according to an exemplary embodiment of the present invention. In an exemplary implementation, the signal streams of the codewords are orthogonal.

In step 601, the base station determines that an uplink fast feedback signal is received.

Upon receiving the feedback signal, the base station converts the received time-domain feedback signal to the frequency-domain signal through the FFT in step 603. Next, the base station splits the Fourier-transformed signal to six tiles as shown in FIG. 1 or FIG. 2.

In step 605, the base station calculates the squares of the correlation values of the receive signal streams and the codewords with respect to the split tile bundles (e.g., six tiles). For example, the base station calculates the squares of the correlation values of the receive signal streams and the codewords based on Equation (1).

In step 607, the base station extracts the maximum value max(R) from the calculated correlation squares. Also, the base station calculates the average value sum (R)/M of the correlation square values.

In step 609, the base station calculates the average receive power and the average receive noise power using the maximum value and the average value of the correlation squares.

In step 611, the base station calculates the CINR using the average receive power and the average receive noise power. For example, when the signal streams of the codewords are orthogonal, the base station calculates the CINR of the fast feedback channel based on Equation (3).

Next, the base station finishes this process.

Figure 7:
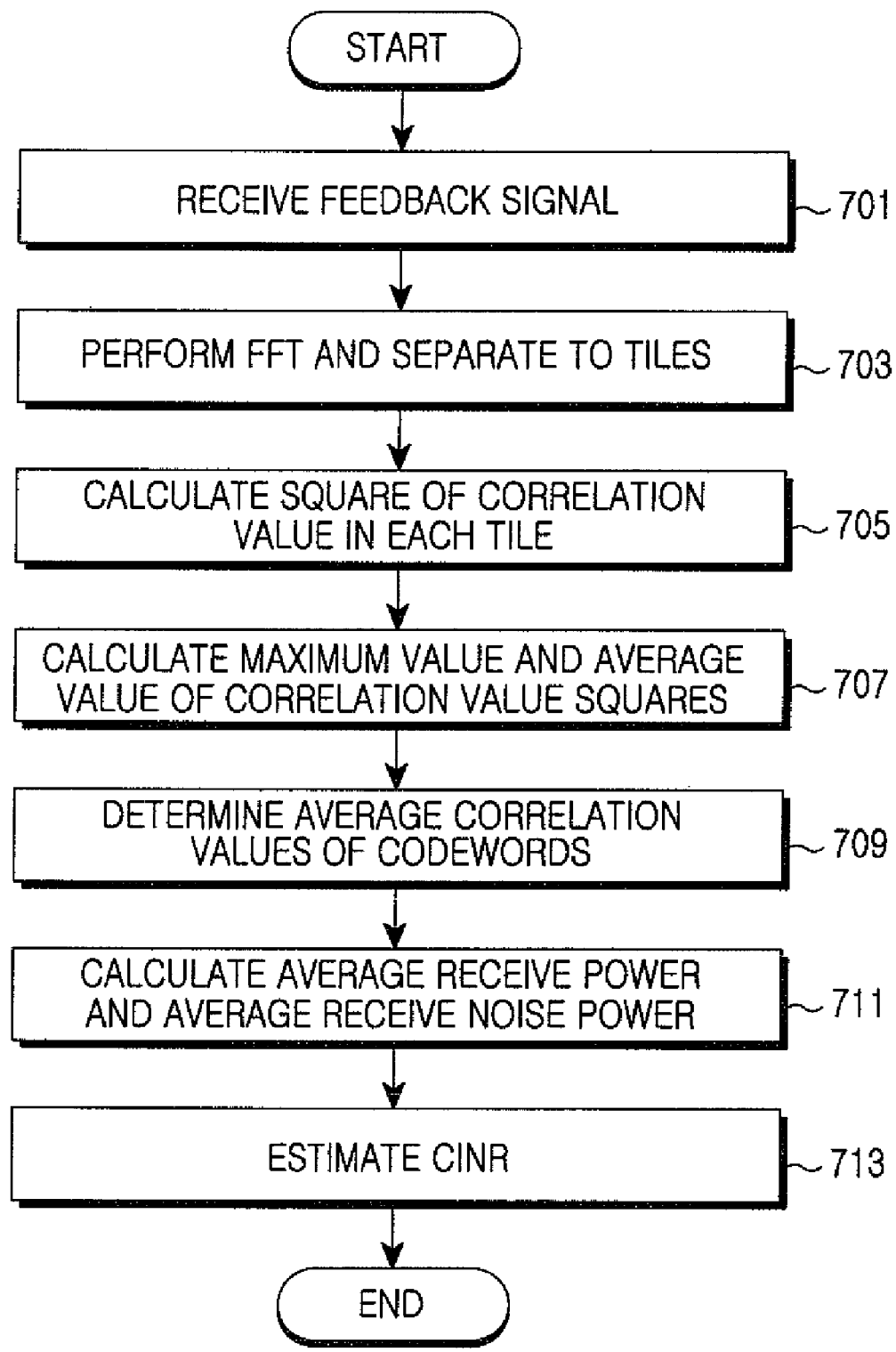
FIG. 7 is a flowchart of a method for estimating the CINR at the base station according to another exemplary embodiment of the present invention.

FIG. 7 is a flowchart of a method for estimating the CINR at the base station according to another exemplary embodiment of the present invention. In an exemplary implementation, the signal streams of the codewords are quasi-orthogonal.

In step 701, the base station determines that the uplink fast feedback signal is received.

Upon receiving the feedback signal, the base station converts the received time-domain feedback signal to the frequency-domain signal through the FFT in step 703. Next, the base station splits the Fourier-transformed signal to six tiles as shown in FIG. 1 or FIG. 2.

In step 705, the base station calculates the squares of the correlation values of the receive signal streams and the codewords with respect to the split tile bundles (e.g., six tiles). For example, the base station calculates the squares of the correlation values with respect to the receive signal streams and the codewords based on Equation (1).

In step 707, the base station extracts the maximum value max(R) of the calculated correlation squares and calculates the average value sum(R)/M of the correlation square values.

In step 709, the receiver determines the correlation property of the codewords. In more detail, when the signal streams of the codewords are quasi-orthogonal, the base station calculates the correlation property of the codewords based on Equation (5) to calculate the average receive noise power of the fast feedback channel based on Equation (4).

In step 711, the base station calculates the average receive power and the average receive noise power using the maximum value and the average value of the correlation value squares.

In step 713, the base station calculates the CINR using the average receive power and the average receive noise power. For example, the base station calculates the CINR of the fast feedback channel based on Equation (4).

Next, the base station finishes this process.

As described above, the base station estimates the CINR of the fast feedback channel using the signal stream of one tile bundle. Thus, the base station can control the power of the uplink signal using the estimated CINR.

Alternatively, the base station can estimate the CINR for the signal stream on the tile basis of one tile bundle. In this case, the base station can calculate the combining coefficient of the multi-antenna using the estimated CINR.

According to another exemplary implementation, when the wireless communication system constitutes the fast feedback channel by allocating six 4×3 subcarrier bundles (=tiles) on the frequency-time axis, the base station estimates the CINR for the signal stream length of 72 (=12×6). The base station may estimate the CINR for the signal stream length of 12 (=4×3).

As set forth above, in the wireless communication system for transmitting the orthogonal or quasi-orthogonal signal stream, the CINR is estimated using the maximum value and the average value of the correlation squares calculated in the process of the asynchronous detection of the orthogonal signal stream and the quasi-orthogonal signal stream. With the accurate CINR estimated, the channel information delivery and the stable system operation can be achieved. Further, since the CINR estimation is applicable to any subcarrier structure, the system can be operated flexibly.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for estimating a Carrier to Interference and Noise Ratio (CINR) of an uplink channel in a wireless communication system, the apparatus comprising:
   a subcarrier separator for separating subcarrier bundles from a received signal;
   a detector for calculating squares of correlation values acquired by correlating at least one codeword with signal streams of the separated subcarrier bundles;
   a maximum value extractor for extracting a maximum correlation value square from the correlation value squares calculated by the detector; and
   a CINR estimator for estimating a CINR using the maximum correlation value square of the correlation value squares and an average value of the correlation value squares calculated at the detector.

2. The apparatus of claim 1, further comprising:
   an antenna for receiving a signal;
   a Radio Frequency (RF) processor for converting an RF signal received on the antenna to a baseband signal; and
   an Orthogonal Frequency Division Multiplexing (OFDM) demodulator for Fourier-transforming the baseband time-domain signal output from the RF processor to a frequency-domain signal and for outputting the frequency-domain signal to the subcarrier separator.

3. The apparatus of claim 1, wherein the subcarrier separator separates the subcarrier bundles from the signal received on a fast feedback channel.

4. The apparatus of claim 1, wherein the detector comprises:
   at least one correlator for calculating correlation values of the at least one codeword and the signal streams of the separated subcarrier bundles; and
   at least one squarer for squaring the correlation values.

5. The apparatus of claim 4, wherein the detector comprises a number of correlators and a number of squarers as many as a number of codewords available in the system.

6. The apparatus of claim 1, wherein the CINR estimator comprises:
   an adder for calculating a sum of the correlation value squares provided from the detector; and
   a CINR calculator for calculating an average value from the sum of the correlation value squares and for calculating the CINR using the maximum value of the correlation value squares and the average value.

7. The apparatus of claim 6, wherein the CINR calculator calculates the CINR based on the following equation:

$$CINR = \frac{M \cdot \max(r[i]) - \sum_{i=0}^{M-1} r[i]}{\sum_{i=0}^{M-1} r[i] - \max(r[i])},$$

where M denotes a number of codewords used in the wireless communication system, r[i] denotes a square of a correlation value of an $i^{th}$ codeword of the codewords and the receive signal stream, max(r[i]) denotes the maximum correlation value square and $$\sum_{i=0}^{M-1} r[i]$$

denotes the sum of the correlation value squares.

8. The apparatus of claim 1, wherein the CINR estimator comprises:
   an adder for calculating a sum of the correlation value squares provided from the detector;
   a correlator for, when the signal streams of the codewords are quasi-orthogonal, calculating a sum of correlation values of codewords available in the system; and
   a CINR calculator for calculating an average value from the sum of the correlation value squares and for calculating the CINR by summing a maximum value of the correlation value squares, the average value and the correlation values of the codewords.

9. The apparatus of claim 8, wherein the CINR calculator calculates the CINR based on the following equation:

$$CINR = \frac{M \cdot \max(r[i]) - \sum_{i=0}^{M-1} r[i]}{\sum_{i=0}^{M-1} r[i] - (1 + \rho)\max(r[i])}$$

where M denotes a number of codewords used in the wireless communication system, ρ denotes the sum of the correlation values of the codewords, r[i] denotes a square of a correlation value of an $i^{th}$ codeword of the codewords and the recieve signal stream, max(r[i]) denotes the maximum correlation value square and $$\sum_{i=0}^{M-1} r[i]$$

denotes the sum of the correlation value squares.

10. A method for estimating a Carrier to Interference and Noise Ratio (CINR) of an uplink channel in a wireless communication system, the method comprising:
    separating subcarrier bundles from a received signal;
    calculating, by a detector, squares of correlation values acquired by correlating at least one codeword with signal streams of the separated subcarrier bundles;
    extracting, by a maximum value extractor, a maximum correlation value square;
    calculating, by a CINR estimator, an average value of the correlation value squares; and
    estimating, by the CINR estimator, a CINR using the maximum correlation value square of the correlation value squares and the average value of the correlation value squares.

11. The method of claim 10, wherein the separating of the subcarrier bundles comprises:
    converting a Radio Frequency (RF) signal received on an antenna to a baseband time-domain signal;
    Fourier-transforming the baseband time-domain signal to a frequency-domain signal; and separating the subcarrier bundles from the frequency-domain signal.

12. The method of claim 10, wherein the separating of the subcarrier bundles comprises separating subcarrier bundles from a signal received on a fast feedback channel.

13. The method of claim 10, wherein the estimating of the CINR comprises:
calculating an average receive power and an average receive noise power using the maximum value and the average value; and
calculating the CINR using the average receiving power and the average receive noise power.

14. The method of claim 13, wherein the calculating of the CINR comprises calculating based on the following equation:

$$CINR = \frac{M \cdot \max(r[i]) - \sum_{i=0}^{M-1} r[i]}{\sum_{i=0}^{M-1} r[i] - \max(r[i])},$$

where M denotes a number of codewords used in the wireless communication system, $r[i]$ denotes a square of a correlation value of an $i^{th}$ codeword of the codewords and the receive signal stream, $\max(r[i])$ denotes the maximum correlation value square and $$\sum_{i=0}^{M-1} r[i]$$

denotes the sum of the correlation value squares.

15. The method of claim 10, wherein the estimating of the CINR comprises:
when the signal streams of the at least one codeword are quasi-orthogonal, calculating a sum of correlation values by correlating the at least one codeword;
calculating an average receive power and an average receive noise power using the sum of the correlation values of the at least one codeword, the maximum value, and the average value; and
calculating the CINR using the average receive power and the average receive noise power.

16. The method of claim 15, wherein the CINR is calculated based on the following equation:

$$CINR = \frac{M \cdot \max(r[i]) - \sum_{i=0}^{M-1} r[i]}{\sum_{i=0}^{M-1} r[i] - (1 + \rho)\max(r[i])},$$

where M denotes a number of codewords used in the wireless communication system, $\rho$ denotes the sum of the correlation values of the codewords, $r[i]$ denotes a square of a correlation value of an $i^{th}$ codeword of the codewords and the receive signal stream, $\max(r[i])$ denotes the maximum correlation value square and $$\sum_{i=0}^{M-1} r[i]$$

denotes the sum of the correlation value squares.

17. An apparatus for estimating a Carrier to Interference and Noise Ratio (CINR) comprising:
a separator for separating subcarrier bundles from a received signal;
a detector for determining a square of a correlation value acquired by correlating a codeword with a signal stream of the separated subcarrier bundles;
a maximum value extractor for extracting a maximum correlation value square from the correlation value squares calculated by the detector; and
a CINR estimator for estimating a CINR using the maximum correlation value square determined and an average value of the correlation value square calculated by the detector.

18. The apparatus of claim 17, further comprising:
an antenna for receiving a signal;
a Radio Frequency (RF) processor for converting an RF signal received on the antenna to a baseband signal; and
an Orthogonal Frequency Division Multiplexing (OFDM) demodulator for Fourier-transforming the baseband time-domain signal output from the RF processor to a frequency-domain signal and for outputting the frequency-domain signal to the separator.

19. The apparatus of claim 17, wherein the separator separates the subcarrier bundles from the signal received on a fast feedback channel.

20. The apparatus of claim 17, wherein the detector comprises:
a correlator for determining a correlation value of the codeword and the signal stream of the separated subcarrier bundles; and
a squarer for squaring the correlation value.

* * * * *